United States Patent
Lin et al.

(10) Patent No.: US 12,523,324 B1
(45) Date of Patent: Jan. 13, 2026

(54) PRESSURE RELIEF STRUCTURE FOR FLOATING JOINT

(71) Applicant: FOSITEK CORPORATION, New Taipei (TW)

(72) Inventors: Chun-Han Lin, New Taipei (TW); Yung-Chih Tseng, New Taipei (TW); Dai-Rong Li, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 19/050,307

(22) Filed: Feb. 11, 2025

(30) Foreign Application Priority Data

Jan. 10, 2025 (TW) .................................. 114101167

(51) Int. Cl.
*F16L 37/53* (2006.01)

(52) U.S. Cl.
CPC ............ *F16L 37/53* (2013.01); *F16L 2201/20* (2013.01)

(58) Field of Classification Search
CPC ....... F16L 37/53; F16L 2201/20; F16L 27/12; F16L 27/02; F16L 27/10; F16L 27/026; F16L 27/08; F16L 37/52; F16L 37/50; H05K 7/20781; H05K 7/20818; H05K 7/20772; H05K 7/20272
See application file for complete search history.

(56) References Cited

U.S. PATENT DOCUMENTS

| | | | |
|---|---|---|---|
| 4,886,301 A * | 12/1989 | Remsburg | F16L 37/56 285/39 |
| 12,247,685 B2 * | 3/2025 | Marquis | F16L 37/52 |
| 12,372,179 B1 * | 7/2025 | Tseng | F16L 27/12 |
| 12,404,959 B1 * | 9/2025 | Hsu | F16L 27/12 |
| 2023/0143344 A1 * | 5/2023 | Marquis | F16L 37/52 285/261 |
| 2025/0198556 A1 * | 6/2025 | Marques Barroca | F16L 37/50 |

* cited by examiner

*Primary Examiner* — David Bochna
(74) *Attorney, Agent, or Firm* — Demian K. Jackson; Jackson IPG PLLC (57) ABSTRACT

A pressure relief structure for floating joint includes a hollow fixed retainer have an inner wall groove; an adapter joint having a first section assembled to the fixed retainer and a second section extended to a holed closed side of the fixed retainer, and a shoulder portion formed between the first and second sides; a slidable member including a base flange radially slidably attached to an outer wall surface of the closed side and a cylindrical portion extended into the fixed retainer to connect with the second section; an internal retaining ring set in the inner wall groove with an abutting surface flush with the shoulder portion; and an abutting washer pushed by a spring against the abutting surface and the shoulder portion to receive two supporting forces, enabling a reduced radial friction between the adapter joint and the abutting washer and reliable linear pipe connection via the floating joint.

4 Claims, 8 Drawing Sheets

PRESSURE RELIEF STRUCTURE FOR FLOATING JOINT

This application claims the priority benefit of Taiwan patent application number 114101167 filed on Jan. 10, 2025, the disclosure of which is hereby incorporated by reference in its entirety.

FIELD OF THE INVENTION

The present invention relates to a joint pressure relief structure, and more particularly, to a pressure relief structure for a floating joint.

BACKGROUND OF THE INVENTION

A server rack is an important basic structure in datacenters nowadays. The server rack usually has a large number of high-performance servers arranged therein. Following the constantly upgraded computing ability and increased component density of the servers, they produce more and more heat during operation thereof. Under this situation, insufficient heat dissipation performance would have direct influences on the stability and service life of the servers. Air cooling plays a major role in the conventional server heat dissipation. However, the heat dissipation efficiency of the air cooling can no longer satisfy the heat dissipation required by the servers with upgraded operational performance, particularly for the server racks with high density of servers. Since the servers are closely arranged in the server racks with a relatively narrow space left between them, air in the server racks is prevented from flowing to result in worse heat accumulation and deteriorated operational performance. To overcome the limitation of air cooling, liquid or water cooling has been gradually adopted to replace air cooling for dissipating heat produced by servers. Since the precision electronic components in the servers require for highly reliable water cooling system, any water leaking would cause serious damages to the electronic components. It is therefore necessary to set even stricter requirements for the water tightness of the water cooling pipe system.

The existing water cooling servers are usually equipped with quick connect couplers, so that cooling pipes at a movable side (i.e. the server side) and a fixed side (i.e. the server rack side) can be conveniently connected or disconnected to or from each other. While the quick connect couplers allow for flexible and quick demounting and maintenance of the servers, the couplers, which include a male and a female coupler member, might not be easily aligned with each other in the process of connection due to radial deviation or tolerance in size or position, which would have a reverse influence on the leakage tightness of the joints between the male and female couplers. To solve the problem of radial deviation in position, some server rack designs include guide posts provided on the fixed side (i.e. the server rack) and guide blocks provided on the movable side (i.e. the server). The guide posts can be correspondingly inserted into guide holes provided on the guide blocks to achieve accurate connection of the male and female couplers. There are also other designs that employ a floating joint structure, which is radially slidable relative to a fixed retainer to thereby correct the radial deviation between the male and female couplers and ensure good water-tight and operationally convenient connection of the quick connect couplers.

Figure 1A:
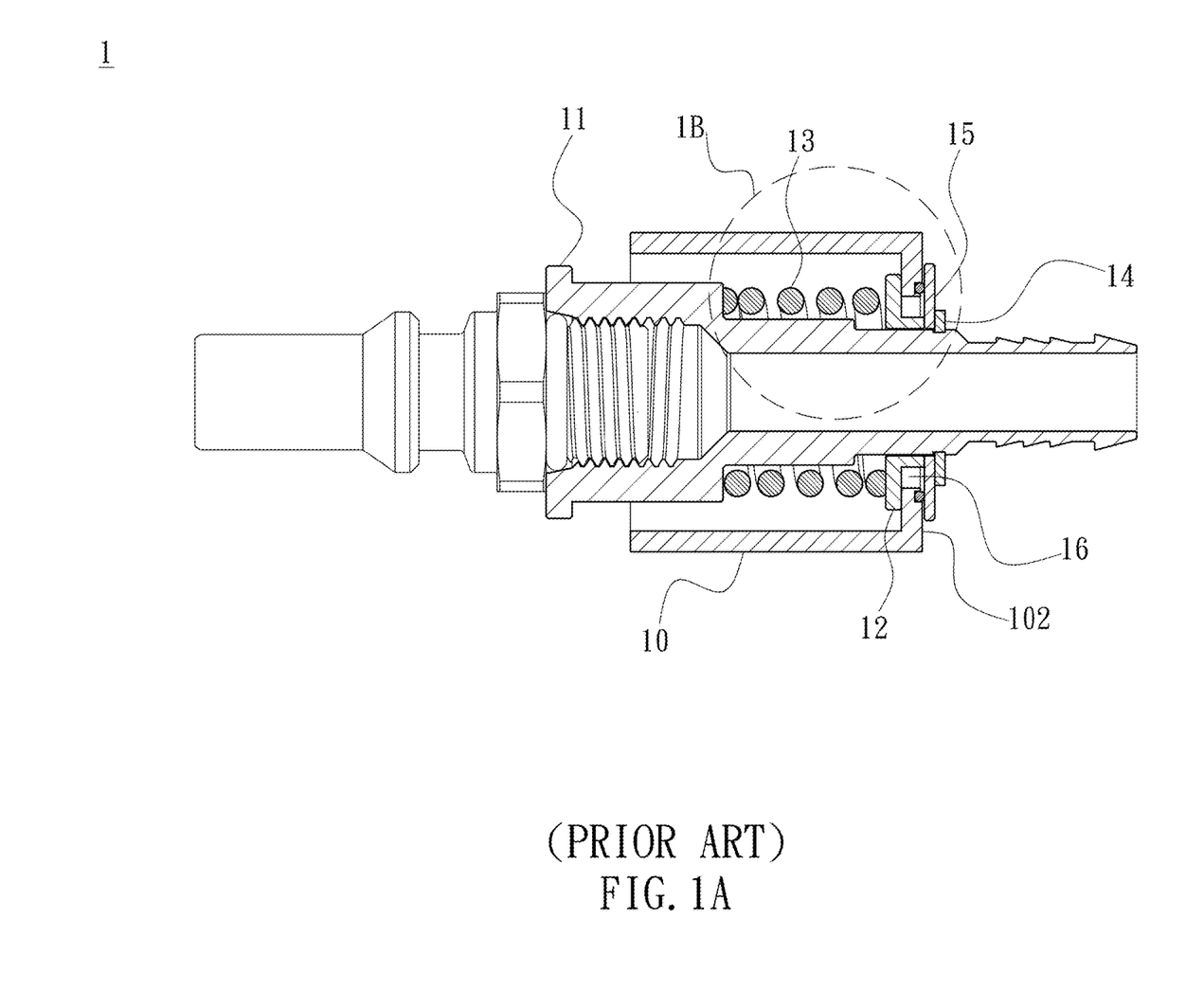
FIG. 1A is a sectional side view of a conventional floating joint with pressure relief structure.

FIG. 1A illustrates a prior art floating joint structure 1, which includes an adapter joint 11 radially movable relative to a fixed retainer 10 to overcome the problem of misalignment between the male and female couplers due to any radial deviation or tolerance between them. However, the conventional floating joint structure including a pressure relief structure 1 which has the following disadvantages:

(1) It requires a relatively large radial space for use

As shown in FIG. 1A, the conventional floating joint with pressure relief structure 1 includes a slidable washer 12 that is extended through a diametrically smaller hole 16 on the fixed retainer 10. This structure requires a relatively large radial space to significantly limit the flexibility in designing the floating joint with pressure relief structure 1, preventing the same from achieving good effect, particularly when it is used in a space having an insufficient radial size.

Figure 1B:
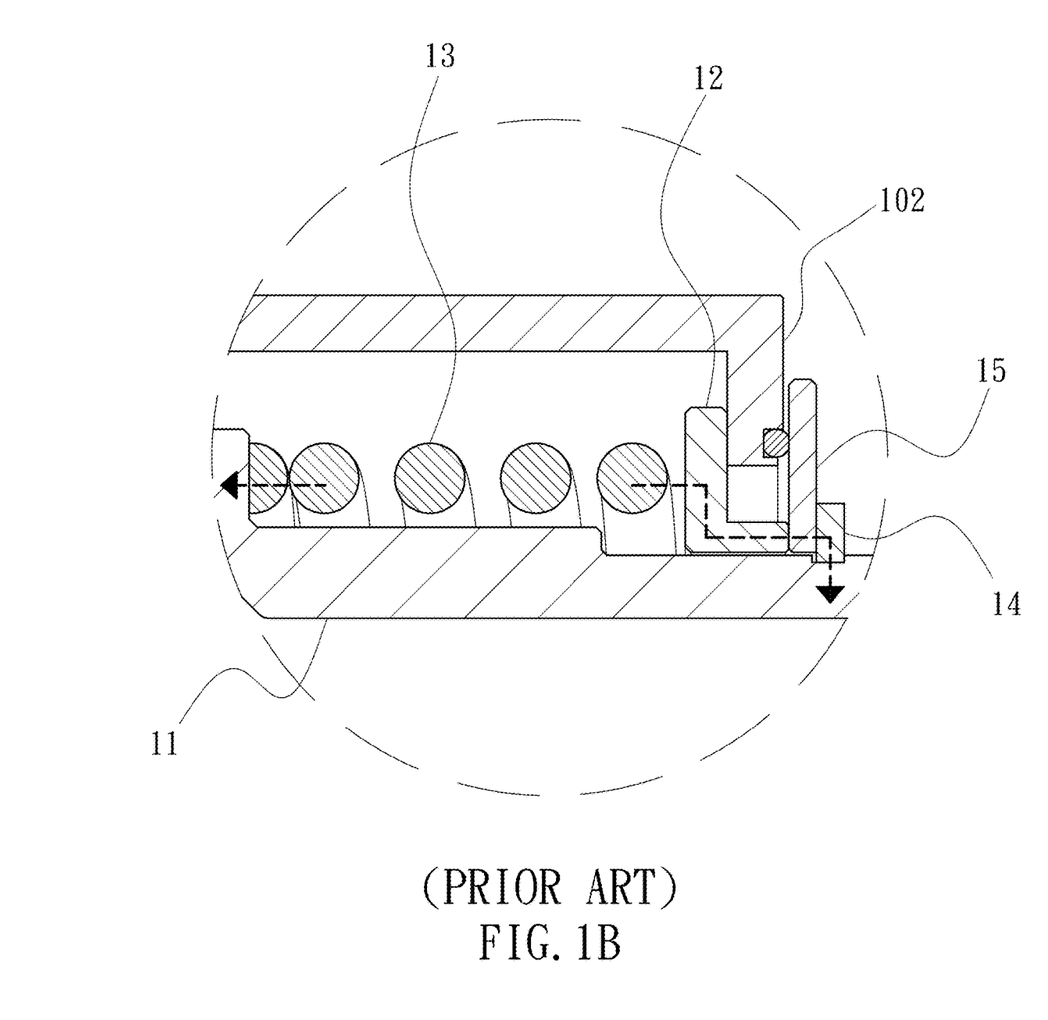
FIG. 1B shows force transmission paths in the conventional floating joint of FIG. 1A when an adapter joint thereof is not skewed.

(2) There is a relatively large frictional force between the slidable washer and an inner wall surface of the fixed retainer when the former slides radially As shown in FIGS. 1A and 1B, the conventional floating joint with pressure relief structure 1 includes a spring 13 fitted on around the adapter joint 11 with a left end of the spring 13 pressed against a shoulder portion of the adapter joint 11. When the spring 13 is compressed, it produces an elastic restoring force that is leftward applied to the shoulder portion of the adapter joint 11. Meanwhile, the spring 13 has a right end pressed against an inner side surface of a flange portion of the slidable washer 12 and accordingly, applies a rightward force to the slidable washer 12.

When the adapter joint 11 is not skewed relative to the fixed retainer 10, a part of the rightward force is transmitted from the right end of the spring 13 to the slidable washer 12 and finally transmitted to the adapter joint 11 via an abutting washer 15 and a retaining ring 14 attached to an outer wall surface of a closed side 102 of the fixed retainer 10. Meanwhile, the other part of the elastic restoring force is transmitted from the right end of the spring 13 to the slidable washer 12 and then further transmitted from the slidable washer 12 to an inner wall surface of the closed side 102 of the fixed retainer 10. With these arrangements, a relatively large frictional force is produced between the slidable washer 12 and the inner wall surface of the closed side 102 of the fixed retainer 10. The large frictional force would affect the sliding ability of the slidable washer 12 and cause quick component wear and tear to reduce the structural robustness of the floating joint.

Figure 1C:
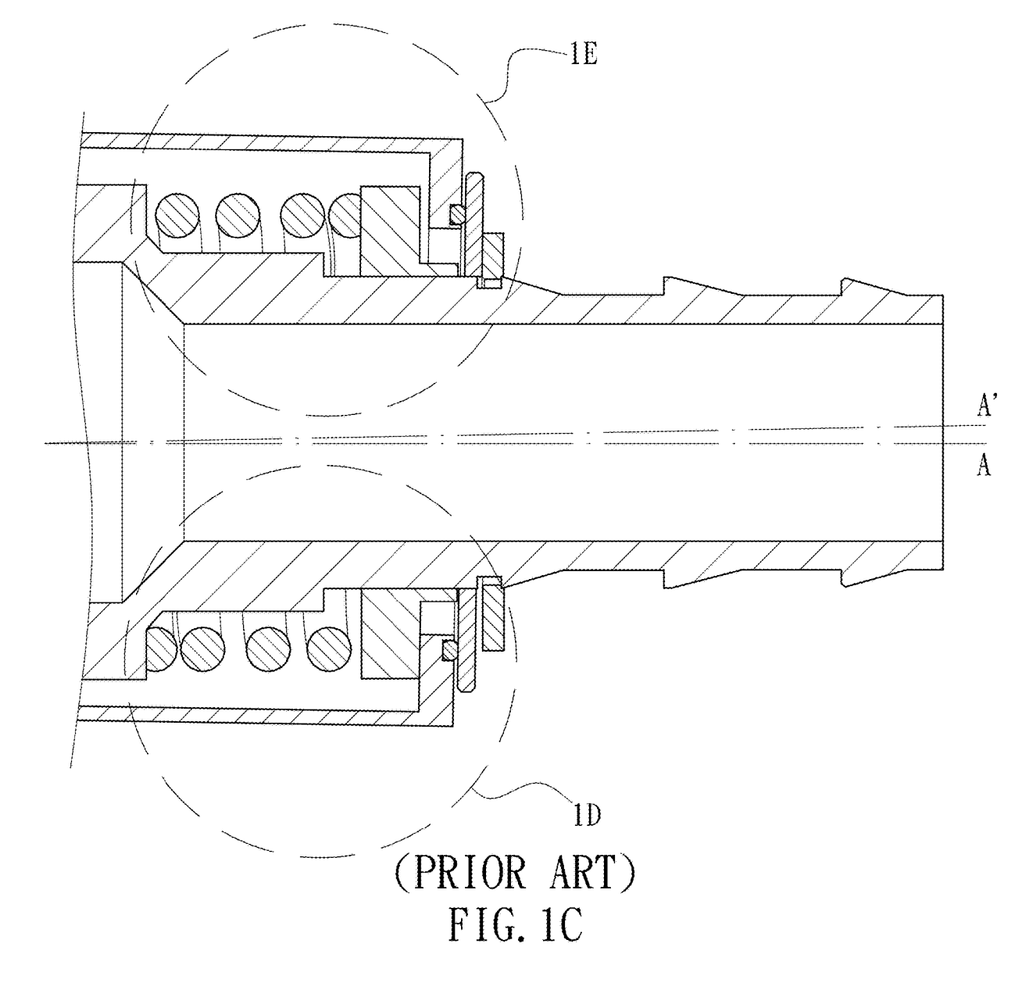
FIG. 1C shows the adapter joint is skewed relative to a fixed retainer in the conventional floating joint of FIG. 1A.

(3) Insufficient stability of the retaining ring fitted on the adapter joint at an outer side of the fixed retainer As shown in FIG. 1C, when the adapter joint 11 partially received in the fixed retainer 10 is deviated or skewed in position, it has a centerline A' not located on the same line as a centerline A of the fixed retainer 10. For example, in the case the adapter joint 11 is skewed upward, its centerline A' would upward deviate from the centerline A of the fixed retainer 10. This condition will significantly affect the stability of the retaining ring 14.

Figure 1D:
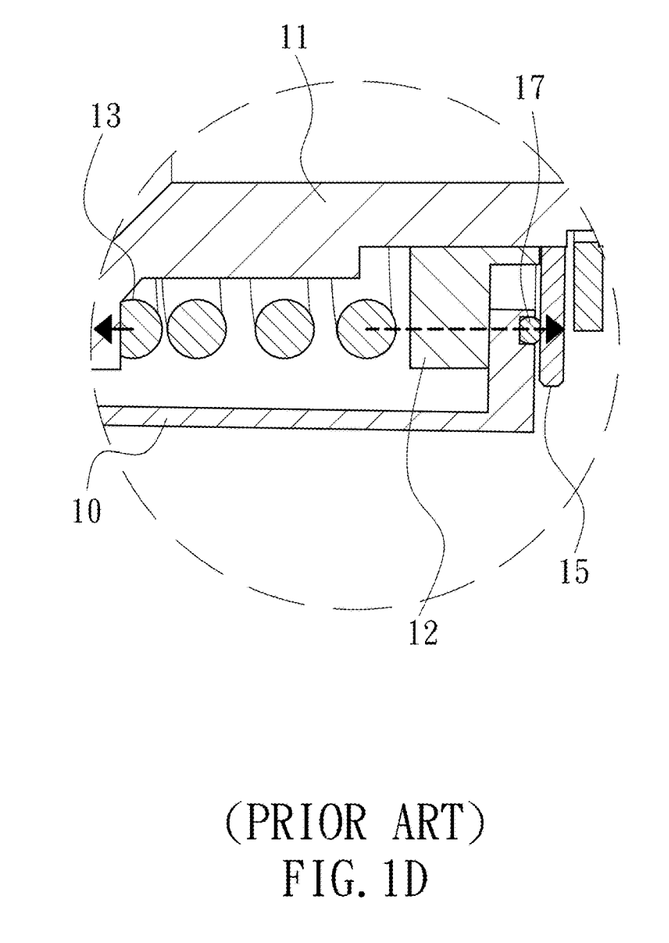
FIG. 1D shows the force transmission paths through components that are located at a lower side of the conventional floating joint of FIG. 1C.

Further, as shown in FIG. 1D, when the left end of the spring 13 is pressed against the shoulder portion of the adapter joint 11, the elastic restoring force of the spring 13 is transmitted from the right end of the spring 13 to the slidable washer 12 and the fixed retainer 10. The force is then transmitted from the fixed retainer 10 to the abutting washer 15 via an elastic element 17 fitted between the fixed retainer 10 and the abutting washer 15, and the elastic restoring force of the spring 13 is finally transmitted from the abutting washer 15 to the retaining ring 14.

Figure 1E:
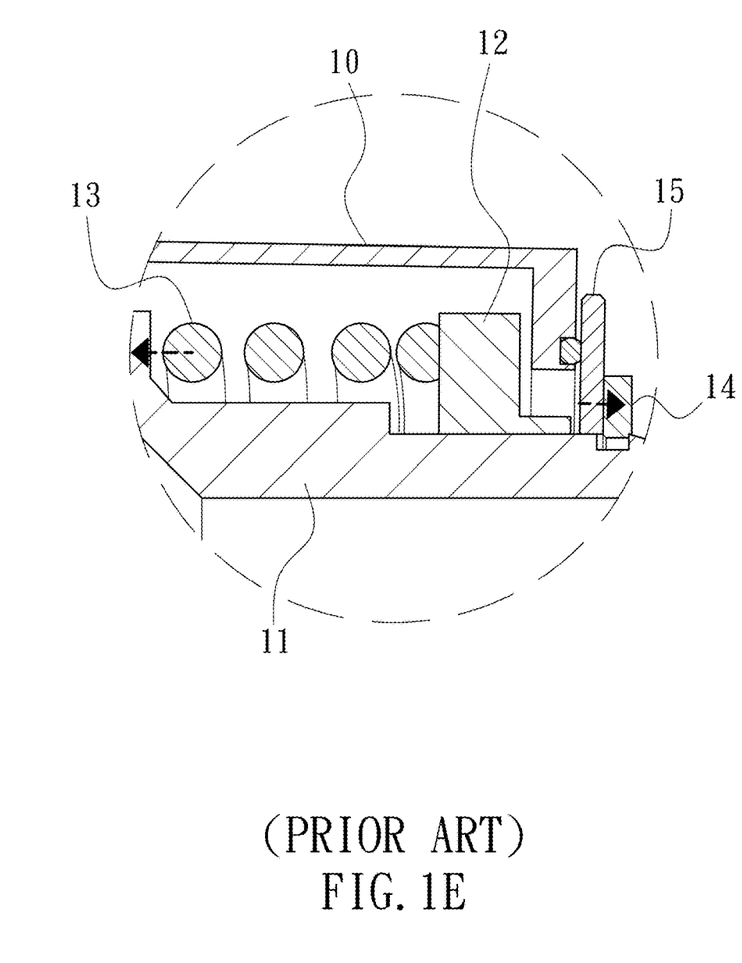
FIG. 1E shows the force transmission paths through components that are located at an upper side of the conventional floating joint of FIG. 1C.

Meanwhile, as shown in FIG. 1E, since the retaining ring 14 has only one side that is subjected to the force and does not have any external structure for supporting it, the force passing through a hole of the retaining ring 14 might be unevenly applied to the retaining ring 14 to cause failure or loosening of the retain ring 14 from the adapter joint 11. This condition would no doubt have an adverse influence on the overall structural stability of the conventional floating joint 1.

(4) Having a weak point in the force transmission mechanism

Please refer to FIGS. 1C to 1E again. The retaining ring 14 serves as a key element for supporting the structure of the floating joint 1 and its stability is easily subjected to various influences, such as the direction of an external force applied thereto and positional deviation of the structure. Therefore, the retaining ring 14 forms a weak point in the force transmission across the existing floating joint 1 and will lead to reduced overall structural stability and reliability of the existing floating joint 1.

It is therefore desirable to solve the technical problems in the existing floating joint 1 designed for water cooling servers.

SUMMARY OF THE INVENTION

To effectively solve the above technical problem in the prior art, it is a primary object of the present invention to provide a pressure relief structure for floating joint, which is able to reduce a frictional force produced when an adapter joint is radially slid relative to an abutting washer, and is usable in a space having insufficient radial space.

To achieve the above and other objects, the pressure relief structure for floating joint according to an embodiment of the present invention includes a fixed retainer, an adapter joint, a slidable member, an internal retaining ring, an abutting washer, and a spring. The fixed retainer has an open side and an opposite closed side provided with a through hole, and internally defines a receiving space located between the open side and the closed side. The fixed retainer has an inner wall surface facing toward the receiving space, and the inner wall surface has an inner wall groove formed around it. The adapter joint has a first and a second section and is assembled to the fixed retainer. The first section is extended from the receiving space toward the open side of the fixed retainer, and the second section is extended to the through hole on the closed side. A shoulder portion is formed between the first and the second side at a location corresponding to the inner wall groove of the fixed retainer. The slidable member includes a cylindrical portion and a base portion. The cylindrical portion is axially extended from one side of the base portion and the base portion is radially outward expanded to form a base flange. The cylindrical portion extends from an outer side of the closed side of the fixed retainer through the through hole into the receiving space to connect with the second section of the adapter joint. The base flange is radially slidably attached to an outer wall surface of the closed side. The internal retaining ring is provided in the receiving space and includes an outer ring portion set in the inner wall groove of the fixed retainer and an abutting surface radially protruded from the inner wall groove into the receiving space. The abutting surface is faced toward the closed side and located parallel and flush with the shoulder portion of the adapter joint. The abutting washer is provided in the receiving space of the fixed retainer and fitted around an outer wall surface of the adapter joint. The abutting washer has a first side and a second side facing toward the open side and the closed side of the fixed retainer, respectively; and the first side of the abutting washer is abutted against the abutting surface of the internal retaining ring and the shoulder portion of the adapter joint at the same time. The spring is provided in the receiving space of the fixed retainer and is fitted around an outer wall surface of the second section of the adapter joint. The spring has an end pressed against the second side of the abutting washer and another end against an inner wall surface of the closed side of the fixed retainer.

According to the technical solution of the present invention, the first side of the abutting washer is abutted against the abutting surface of the internal retaining ring and the shoulder portion of the adapter joint at the same time. With this design, when the shoulder portion provides a supporting force, the abutting surface also provides an additional supporting force. With the two supporting forces, a frictional force produced when the adapter joint is radially slid relative to the abutting washer can be reduced to increase the reliability of two coupler members connected end to end. And, the pressure relief structure is usable with a fixed retainer having insufficient radial space.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof. For the purpose of easy to understand, elements that are the same in the preferred embodiments are denoted by the same reference numerals.

Figure 2:
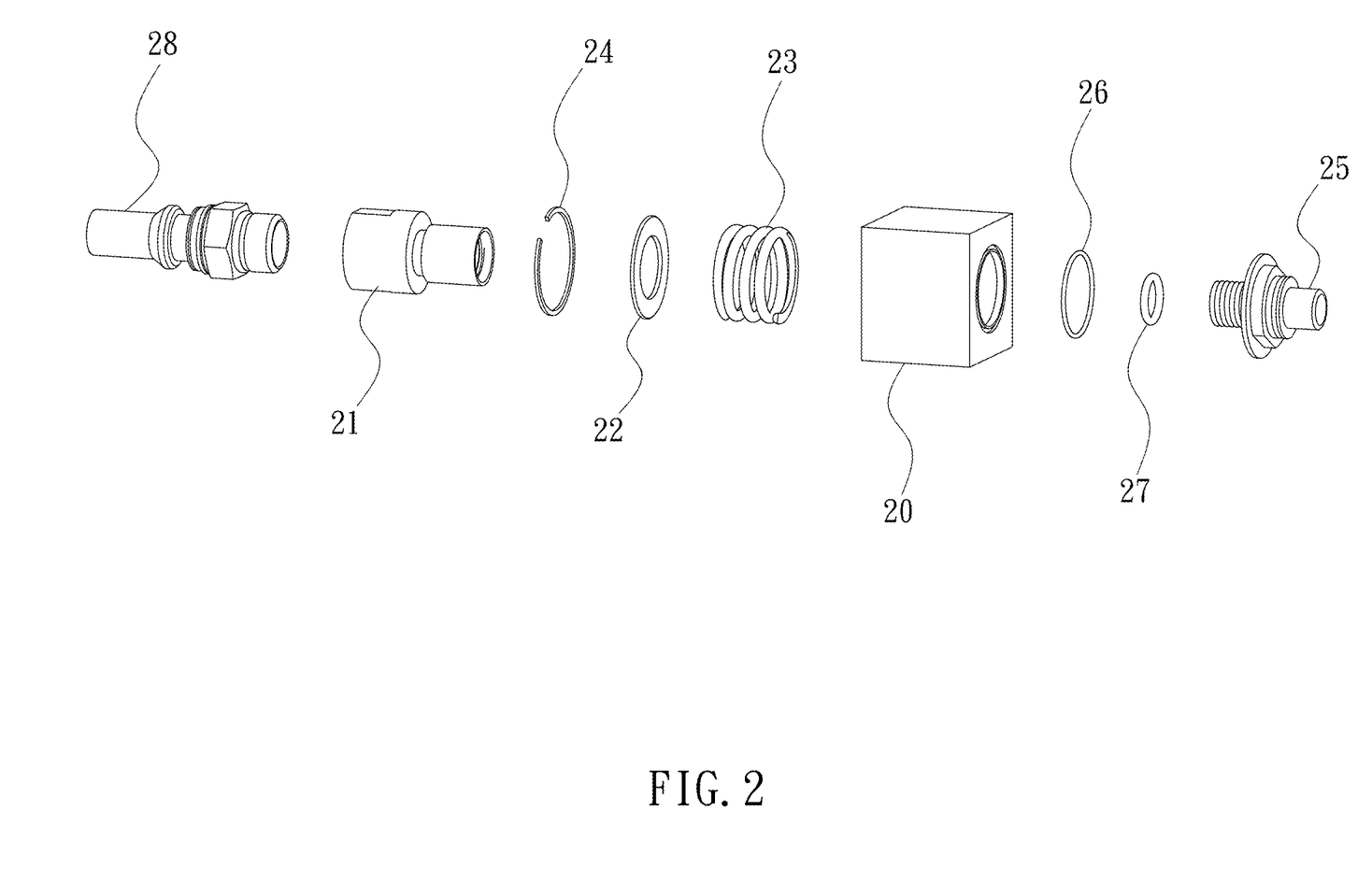
FIG. 2 is an exploded perspective view of a pressure relief structure for floating joint according to a first embodiment of the present invention.
Figure 3:
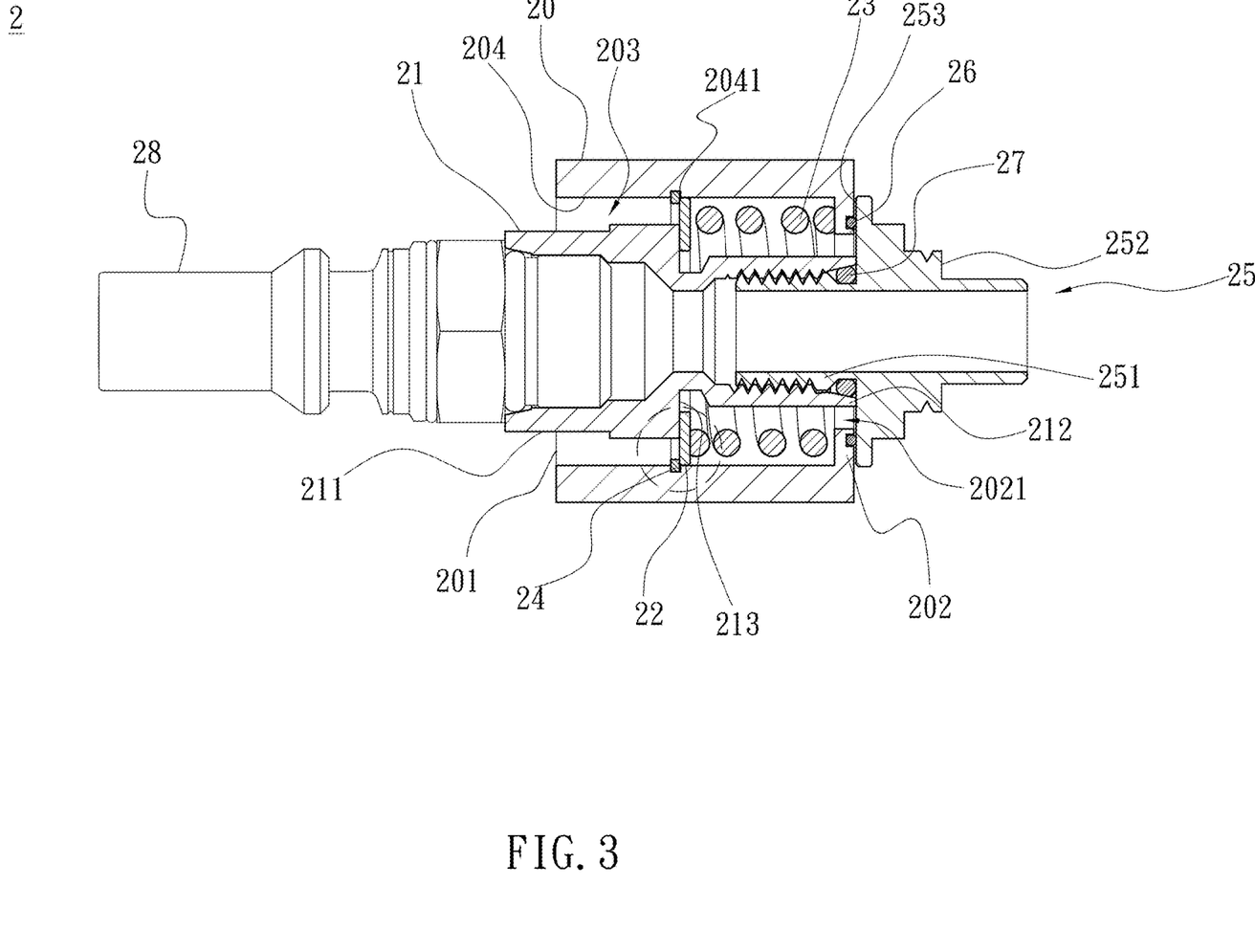
FIG. 3 is an assembled sectional side view of the pressure relief structure for floating joint according to the first embodiment of the present invention.
Figure 4:
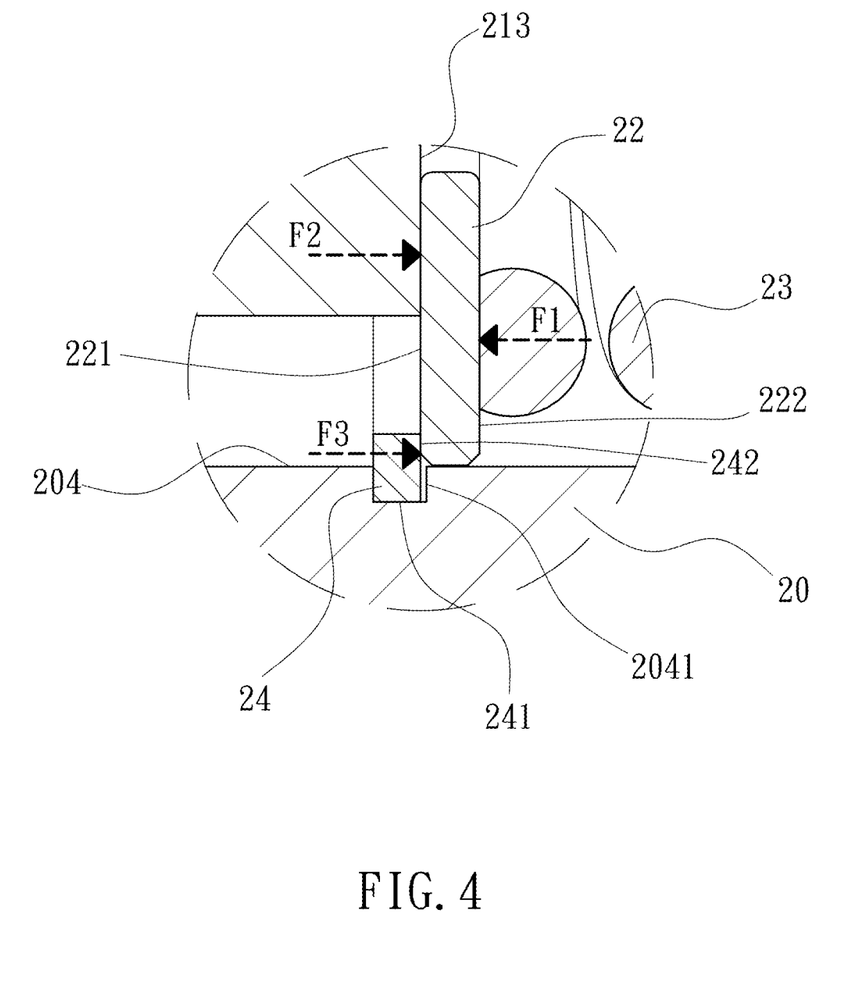
FIG. 4 is an enlarged view of the circled area of FIG. 3.
Figure 5A:
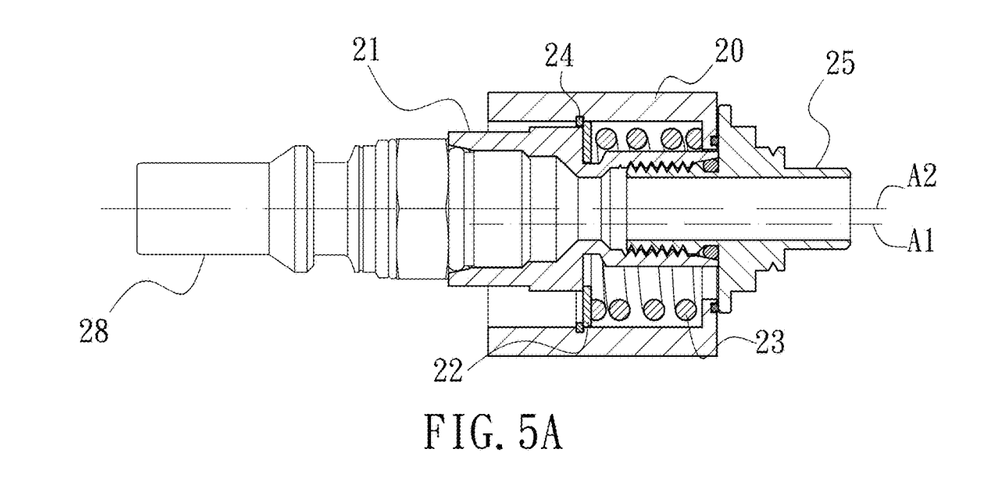
FIG. 5(A) shows an adapter joint and a fixed retainer included in the first embodiment of the present invention have non-coaxial centerlines.
Figure 5B:
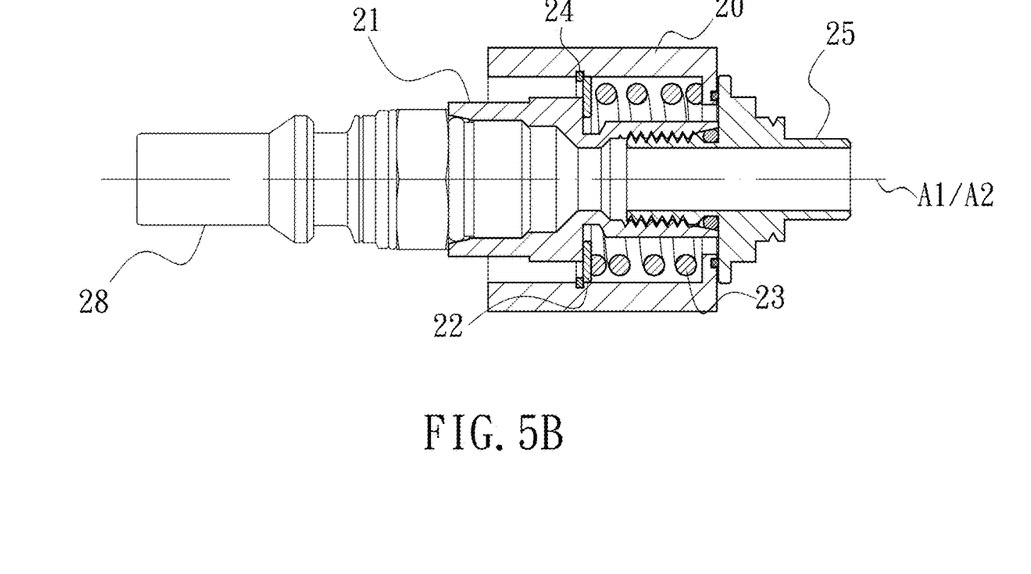
FIG. 5(B) shows the adapter joint and the fixed retainer have coaxial centerlines.

Please refer to FIG. 2 that is an exploded perspective view of a pressure relief structure for floating joint according to a first embodiment of the present invention; to FIG. 3 that is an assembled sectional side view of the pressure relief structure for floating joint of FIG. 2; to FIG. 4 that is an enlarged view of the circled area of FIG. 3; and to FIG. 5 that shows the manner in which the pressure relief structure for floating joint of the present invention works. For the purpose of conciseness and clarity, the present invention is also briefly referred to as the pressure relief structure and generally denoted by reference numeral 2.

As shown in FIGS. 2 to 4, the pressure relief structure 2 according to the first embodiment of the present invention includes a fixed retainer 20, an adapter joint 21, a slidable member 25, an internal retaining ring 24, an abutting washer 22, and a spring 23.

The fixed retainer 20 includes an open side 201 and an opposite closed side 202 and internally defines a receiving space 203 and an inner wall surface 204. The receiving space is located between the open and the closed side 201, 202 for accommodating related components of the present invention therein. The closed side 202 of the fixed retainer 20 is provided with a through hole 2021. The open side 201 and the through hole 2021 are communicable with the receiving space 203 to form an internal passage structure. The inner wall surface 204 surrounds and faces toward the receiving space 203 and has an inner wall annular groove 2041 formed around it.

The adapter joint 21 includes a first section 211 and a second section 212. The adapter joint 21 is assembled to the fixed retainer 20 with the first section 211 extending from the receiving space 203 toward the open side 201 of the fixed retainer 20, while the second section 212 is extended from the receiving space 203 to the through hole 2021 on the closed side 202. In the first embodiment, the first section 211 has a part extended to an outer side of the open side 201 of the fixed retainer 20 while the other part of the first section 211 is located in the receiving space 203. The first section 211 has a diameter larger than that of the second section 212, so that a shoulder portion 213 is formed between the first and the second section 211, 212. The shoulder portion 213 is located corresponding to the inner wall annular groove 2041 on the inner circumferential wall surface 204 of the fixed retainer 20. Meanwhile, the adapter joint 21 internally defines a passage axially extending therethrough for stable delivery of a fluid. In other embodiments, the second section 212 of the adapter joint 21 extends through the through hole 2021 on the closed side 202 of the fixed retainer 20 and is exposed. An annular groove is formed on its outer surface for coupling with the external slidable member 25 and fastener 216.

The first section 211 of the adapter joint 21 is mainly used to connect with a quick connect coupler member 28. The first section 211 has an inner wall surface, which may be smooth or provided with female threads, snap-on structure, etc., to match an outer surface of the quick connect coupler member 28, so as to achieve quick assembling and disassembling to and from the quick connect coupler member 28. On the other hand, the second section 212 of the adapter joint 21 has an inner wall surface provided with female threads for connecting with the slidable member 25.

The slidable member 25 is fitted in the second section 212 of the adapter joint 21 and is radially slidably attached to an outer wall surface of the closed side 202 of the fixed retainer 20. Specifically, the slidable member 25 includes a cylindrical portion 251 and a base portion 252. The slidable member 25 internally defines an axial path, which is communicable with the passage in the adapter joint 21 to achieve smooth delivery of fluid.

The cylindrical portion 251 is axially extended from one side of the base portion 252 to form a hollow cylindrical structure. The cylindrical portion 251 is extended from an outer side of the closed side 202 of the fixed retainer 20 through the through hole 2021 into the receiving space 203 to be finally connected with the second section 212 of the adapter joint 21. The cylindrical portion 251 has a front end facing toward the adapter joint 21 and a rear end located adjacent and connected to the base portion 252. The rear end of the cylindrical portion 251 is radially corresponding to the inner wall surface of an end of the second section 212 of the adapter joint 21. The cylindrical portion 251 has an outer wall surface provided with male threads for firmly engaging with the female threads on the second section 212 of the adapter joint 21, so as to ensure reliable connection of the slidable member 25 with the adapter joint 21.

The base portion 252 of the slidable member 25 includes a radially expanded base flange 253, which has a flat contact surface radially slidably attached to the outer wall surface of the closed side 202 of the fixed retainer 20. This design allows the slidable member 25 to move radially in the course of pipe connecting to adapt to required displacement due to any radial deviation or tolerance between two pipes to be connected end to end. Therefore, the pressure relief structure 2 for floating joint of the present invention has upgraded flexibility and adaptation in use.

This structural design of sliding fit not only ensures proper fit between the slidable member 25 and the fixed retainer 20, but also enables the whole pressure relief structure 2 to be self-adaptive to positional adjustment in the process of mounting and operating thereof to reduce stress and friction caused by positional and size deviation of the pipes to be connected end to end.

The internal retaining ring 24 is provided in the receiving space 203 of the fixed retainer 20 and includes an outer ring portion 241 set in the inner wall annular groove 2041 of the fixed retainer 20 and an abutting surface 242 protruded from the inner wall annular groove 2041 into the receiving space 203. The abutting surface 242 of the internal retaining ring 24 is facing toward the closed side 202 of the fixed retainer 20 and is located parallel and flush with the shoulder portion 213 of the adapter joint 21.

The abutting washer 22 is also provided in the receiving space 203 of the fixed retainer 20 and fitted around an outer surface of the adapter joint 21. The abutting washer 22 includes a first side 221 facing toward the open side 201 of the fixed retainer 20 and a second side 222 facing toward the closed side 202 of the fixed retainer 20. The first side 221 is tightly abutted on the abutting surface 242 of the internal retaining ring 24 and the shoulder portion 213 of the adapter joint 21.

The spring 23 is axially fitted on around the outer wall surface of the second section 212 of the adapter joint 21 and located in the receiving space 203 of the fixed retainer 20. The spring 23 has an end pressed on the second side 222 of the abutting washer 22 and another end pressed on an inner wall surface of the closed side 202 of the fixed retainer 20. The spring 23 produces a preload, which forms a stable normal force between the abutting washer 22 and the closed side 202 of the fixed retainer 20, ensuring the adapter joint 21 to quickly restore to a predetermined fixed position after it is moved radially to avoid structural deviation. Meanwhile, the spring 23 has an elastic compression stroke long enough for it to adapt to a change in its axial tolerance, so that the adapter joint 21 can accept a certain range of size tolerance. The spring 23 has a flexibility to support some minor skew adjustment of the adapter joint 21 to thereby give the pressure relief structure 2 with further upgraded dynamic adaptation and operational stability.

Please refer to FIGS. 2 and 3. The pressure relief structure 2 according to the first embodiment of the present invention further includes an elastic element 26 and a sealing element 27.

The elastic element 26, such as an elastic O-ring, is set in an annular groove provided on the outer wall surface of the closed side 202 of the fixed retainer 20. The elastic element 26 is in contact with the base flange 253 of the slidable member 25 to provide a magnitude of interference for producing a normal force.

The sealing element 27, such as a sealing ring, is fitted on around the rear end of the cylindrical portion 251 of the slidable member 25. The sealing element 27 is in sealing contact with the inner wall surface of an end of the second section 212 of the adapter joint 21 to enable upgraded sealing at the joint between the slidable member 25 and the second section 212 of the adapter joint 21.

Please refer to FIG. 4. In the first embodiment, when the preload of the spring 23, as indicated by the leftward arrow F1, is applied to the second side 222 of the abutting washer 22, the first side 221 of the abutting washer 22 is able to axially abut against the abutting surface 242 of the internal retaining ring 24 and the shoulder portion 213 of the adapter joint 21 at the same time. When the quick connect coupler member 28 shown in FIG. 3 is moved in a non-axial motion, the abutting surface 242 of the internal retaining ring 24 and the shoulder portion 213 of the adapter joint 21 together provide two supporting forces as indicated by the two rightward arrows F2, F3, which are directionally opposite to the preload of the spring 23 to effectively balance the preload of the spring 23 applied to the abutting washer 22. With this structural design, the abutting surface 242 of the internal retaining ring 24 can provide an additional supporting force F3 to effectively reduce a frictional force that is produced between the abutting washer 22 and the adapter joint 21 when the adapter joint 21 radially slides relative to the abutting washer 22. As shown in FIG. 3, this structural design enables the slidable member 25 to have upgraded sliding ability and operational stability. That is, the pressure relief structure 2 has significantly enhanced reliability and service life, as well as optimized overall structural stability to overcome the disadvantages of the conventional floating joint with pressure relief structure 1, including insufficient stability of the retaining ring 14 located at an outer side of the fixed retainer 10, weak force transmission mechanism, etc.

Further, since the spring 23 and the abutting washer 22 are located in the receiving space 203 of the fixed retainer 20, their weight is not additionally undertaken by the adapter joint 21 to thereby decrease the load pressure of the adapter joint 21. This design can effectively reduce structural deviation and instability caused by the action of gravitational force. When the first side 221 of the abutting washer 22 is abutted on the abutting surface 242 of the internal retaining ring 24 and the shoulder portion 213 of the adapter joint 21, the preload of the spring 23 can help in balancing the stress distribution in the overall structure to ensure that the adapter joint 21 can always slide freely. Meanwhile, the reduced load pressure of the adapter joint 21 also helps in the connection of the quick connect coupler member 28 with the adapter joint 21 because of the reduced frictional force between them, such that the quick connect coupler member 28 can be reliably and stably held in place without the risk of failing to be suspended in a fixed position due to the action of gravitational force.

Further, since the abutting washer 22 is provided in the receiving space 203 of the fixed retainer 20, the pressure relief structure 2 of the present invention can be used in a fixed retainer 20 having a relatively small radial space. Compared to the conventional pressure relief structure for floating joint 1, which includes a first slidable member 12 to be extended through a diametrically small hole 16 and therefore requires a relatively large radial space, the present invention overcomes the problem of requirement for a big radial space.

Please refer to FIG. 5(A) that shows the adapter joint 21 has a centerline A2 not coaxial with a centerline A1 of the fixed retainer 20; and to FIG. 5(B) that shows the centerline A2 of the adapter joint 21 is coaxial with the centerline A1 of the fixed retainer 20. Please refer to FIGS. 5(A) and 5(B) along with FIGS. 2 to 4. When the centerline A2 of the adapter joint 21 and the centerline A1 of the fixed retainer 20 are coaxial with each other, as shown in FIG. 5(B), the abutting washer 22 and the internal retaining ring 24 that are located between the adapter joint 21 and the fixed retainer 20 can be effectively located symmetrically relative to the centerlines A1, A2, such that the first side 221 of the abutting washer 22 is evenly abutted against the abutting surface 242 of the internal retaining ring 24 and the shoulder portion 213 of the adapter joint 21 to provide stable supporting forces and accordingly, reduce the radial frictional force between the adapter joint 21 and the abutting washer 22, and ensure stable sliding ability of the adapter joint 21.

In the case the adapter joint 21 is deviated upward (see FIG. 5(A)) due to an external force or an error in mounting, its centerline A2 is skewed relative to and non-coaxial with the centerline A1 of the fixed retainer 20, the first side 221 of the abutting washer 22 has the design feature of self-adaptation to keep abutting against the abutting surface 242 of the internal retaining ring 24 and the shoulder portion 213 of the adapter joint 21. When the adapter joint 21 is in the situation of deviation, the abutting surface 242 can provide additional supporting force to effectively compensate the unevenly distributed force over the abutting washer 22 and accordingly reduce the frictional force between the abutting washer 22 and the adapter joint 21 to avoid excessive wear or structural instability caused by the deviation.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A pressure relief structure for floating joint, comprising:
   a fixed retainer having an open side and an opposite closed side and internally defining a receiving space located between the open and the closed side; the closed side being provided with a through hole; and the receiving space being surrounded by an inner wall surface, which has an inner wall annular groove formed around it;
   an adapter joint including a first section and a second section and being assembled to the fixed retainer; the first section being extended from the receiving space toward the open side of the fixed retainer, and the second section being extended from the receiving space to the through hole on the closed side of the fixed retainer; and a shoulder portion being formed between the first and the second section;

a slidable member including a base portion and a cylindrical portion axially extended from one side of the base portion; the base portion including a radially outward expanded base flange, the cylindrical portion being extended from an outer side of the closed side of the fixed retainer through the through hole into the receiving space to connect with the second section of the adapter joint; and the base flange portion being radially slidably attached to an outer wall surface of the closed side of the fixed retainer;

an internal retaining ring being provided in the receiving space and including an outer ring portion set in the inner wall groove of the fixed retainer and an abutting surface protruded from the inner wall groove into the receiving space; and the abutting surface being faced toward the closed side of the fixed retainer and located parallel and flush with the shoulder portion of the adapter joint;

an abutting washer being provided in the receiving space of the fixed retainer and fitted around an outer surface of the adapter joint; the abutting washer having a first side and a second side facing toward the open side and the closed side of the fixed retainer, respectively; and the first side of the abutting washer being abutted against the abutting surface of the internal retaining ring and the shoulder portion of the adapter joint; and a spring being provided in the receiving space of the fixed retainer and fitted on around an outer wall surface of the second section of the adapter joint; and the spring having an end pressed against the second side of the abutting washer and another end pressed against an inner wall surface of the closed side of the fixed retainer.

2. The pressure relief structure for floating joint as claimed in claim 1, wherein the first section of the adapter joint is used to removably connect with a quick connect coupler member.

3. The pressure relief structure for floating joint as claimed in claim 1, further comprising an elastic element provided on an outer wall surface of the closed side of the fixed retainer.

4. The pressure relief structure for floating joint as claimed in claim 1, wherein the cylindrical portion of the slidable member has a front end and a rear end located adjacent and connected to the base portion; and the rear end of the cylindrical portion being located radially corresponding to an inner wall surface at an end of the second section of the adapter joint and having a sealing element fitted around an outer wall surface of the rear end.

* * * * *